US008696882B2

(12) United States Patent
O'Brien et al.

(10) Patent No.: US 8,696,882 B2
(45) Date of Patent: Apr. 15, 2014

(54) NANOENGINEERED FIELD INDUCED CHARGE SEPARATION MEMBRANES AND METHODS OF MANUFACTURE THEREOF (75) Inventors: Kevin C. O'Brien, San Ramon, CA (US); Jeffery J. Haslam, Livermore, CA (US); William L. Bourcier, Livermore, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 903 days.

(21) Appl. No.: 12/630,758

(22) Filed: Dec. 3, 2009

(65) Prior Publication Data

US 2011/0132762 A1   Jun. 9, 2011

(51) Int. Cl.
*B01D 69/02* (2006.01)
*B01D 61/44* (2006.01)
*B01D 61/46* (2006.01)
*B01D 69/06* (2006.01)
*C02F 1/469* (2006.01)

(52) U.S. Cl.
CPC .......... *B01D 69/02* (2013.01); *B01D 2325/14* (2013.01); *C02F 1/4693* (2013.01); *B01D 2325/02* (2013.01); *B01D 2325/04* (2013.01); *B01D 2325/16* (2013.01)
USPC ............... 204/633; 204/522; 210/500.21

(58) Field of Classification Search
CPC ...... B01D 63/087; B01D 69/02; B01D 71/50; B01D 71/56; B01D 2325/02; B01D 2325/04; B01D 2325/14; B01D 2325/16; C02F 1/4693
USPC ............... 204/522, 633; 210/500.21, 500.22, 210/500.39
See application file for complete search history.

(56) References Cited

U.S. PATENT DOCUMENTS

| | | | |
|---|---|---|---|
| 4,655,886 A * | 4/1987 | Oda et al. | 205/524 |
| 5,736,050 A | 4/1998 | Pasternak et al. | |
| 5,961,796 A | 10/1999 | Hitchens et al. | 204/252 |
| 6,221,248 B1 | 4/2001 | Lin et al. | 210/500.34 |
| 6,410,672 B1 | 6/2002 | MacDonald et al. | 526/310 |
| 6,596,838 B1 | 7/2003 | Pinery et al. | |
| 2002/0019448 A1 | 2/2002 | Sugaya et al. | 521/27 |
| 2002/0042451 A1 | 4/2002 | Sugaya | 521/32 |
| 2002/0053511 A1 | 5/2002 | Sugaya et al. | 204/296 |

(Continued)

FOREIGN PATENT DOCUMENTS

| | | | |
|---|---|---|---|
| EP | 0645176 A1 | 3/1995 | |
| EP | 1712558 A1 | 10/2006 | |
| WO | 2007/030202 | 3/2007 | B01D 69/10 |

OTHER PUBLICATIONS

S.J. Monte. "Titanate Coupling Agents." Functional Fillers for Plastics. 2005 (no month). Wiley-VCH Verlag GmbH & Co. pp. 85-104.*

(Continued)

*Primary Examiner* — Keith Hendricks
*Assistant Examiner* — Steven A. Friday
(74) *Attorney, Agent, or Firm* — Dominic M. Kotab (57) ABSTRACT A device according to one embodiment includes a porous membrane having a surface charge and pore configuration characterized by a double layer overlap effect being present in pores of the membrane. A device according to another embodiment includes a porous membrane having a surface charge in pores thereof sufficient to impart anion or cation selectivity in the pores. Additional devices, systems and methods are also presented.

31 Claims, 6 Drawing Sheets

(56) References Cited

U.S. PATENT DOCUMENTS

| | | | |
|---|---|---|---|
| 2002/0079235 A1* | 6/2002 | Molter et al. | 205/746 |
| 2004/0055875 A1 | 3/2004 | Siwy et al. | 204/252 |
| 2004/0122117 A1 | 6/2004 | Yamanaka et al. | 521/25 |
| 2005/0252857 A1* | 11/2005 | Wilson et al. | 204/518 |

OTHER PUBLICATIONS

DuPont Fuel Cells. "DuPont(TM) Nafion® PFSA Membranes." 2009 (no month). Retrieved on Jun. 20, 2013 from <http://www2.dupont.com/FuelCells/en_US/assets/downloads/dfc101.pdf>.*

Valero, F., Barceló, A., Arbós, R. "Electrodialysis Technology—Theory and Applications." Desalination, Trends and Technologies. Feb. 28, 2011. InTech. pp. 3-20.*

Boucier, W., O'Brien, K., Swvel, A., Johnson, M., Bettencourt, K., Letant, S., Felter, T., Langry, K., Wilson, B., Haslam, J., Schaldach, C., Sopchak, D. "FY05 LDRD Final Report Molecular Engineering of Electrodialysis Membranes 03-ERD-060." Mar. 1, 2006. Lawrence Livermore National Laboratory. <https://e-reports-ext.llnl.gov/pdf/330970.pdf>.*

Shaposhnik, VA. and Kesore, K. "An early history of electrodialysis wih permselective membranes." Journal of Membrane Science. Dec. 10, 1997. vol. 136, Issues 1-2. pp. 35-39.*

Lawrence Livermore National Laboratory. "Helping water managers ensure clean and reliable supplies." Science % Technology Review. Jul. 12, 2004. Jul./Aug. 2004 Issue. pp. 4-13.*

Tanaka, Yoshinobu, "Water dissociation in ion-exchange membrane electrodialysis" 2002 Elsevier Science B.V.

Fleischer, R.L,. et al., "Nuclear tracks in solids: principles at d applications" University of California Press, Berkeley, CA, 1975.

Dorschel, B. et. al., "Measurement of the track etch rates along proton and alpha particle trajectories in CR-39 and calculation of the detection efficiency" Elsevier Science B. V., 1999.

Nino, Hiroyuki et al., "Positively charged surface potential of polymer films after excimer laser ablation: Application to selective-area electroless plating on the ablated films" Applied Physics Letters, vol. 60, Issue 21, May 25, 1992.

Borrego, Juan J. et al., "Development and Application of New Positively Charged Filters for Recover of Bacteriophages from Water" Applied and Environmental Microbiology, vol. 57, No. 4, Apr. 1991, p. 1218-1222.

Lytle, David C. et al., "Virus Passage through Track-Etch Membranes Modified by Salinity and a Nonionic Surfactant" Applied and Environmental Microbiology, Jun. 1999, p. 2773-2775.

Ferain, E. et al., "Track-etch templates designed for micro-and nanofabrication" 2003 Elsevier B.V.

Virk, H.S. et al., "Ion track filters: Properties, development and applications" Current Science, vol. 75, No. 8, Oct. 25, 1998.

"Development of charge-mosaic membrane" http://piano.chem.yamaguchi-u.ac.jp/English/theme/mosa.htm.

International Preliminary Report on Patentability from PCT Application No. PCT/US2010/054819 mailed Jun. 14, 2012.

* cited by examiner

NANOENGINEERED FIELD INDUCED CHARGE SEPARATION MEMBRANES AND METHODS OF MANUFACTURE THEREOF

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to materials separation technology, and more particularly to separations in aqueous and nonaqueous fluids using field induced charge separation membranes.

BACKGROUND

Reverse Osmosis (RO), nanofiltration, ultrafiltration, electrodialysis, and electrodeionization are just a few of the technologies that utilize membranes to purify water. One of the key drivers behind the economics of water purification is the amount of energy required to perform the separation. Decreasing the amount of energy required to perform the separation usually decreases the cost of water purification. As a result, there is a market need to decrease the amount or energy required to purify water.

Figure 1:
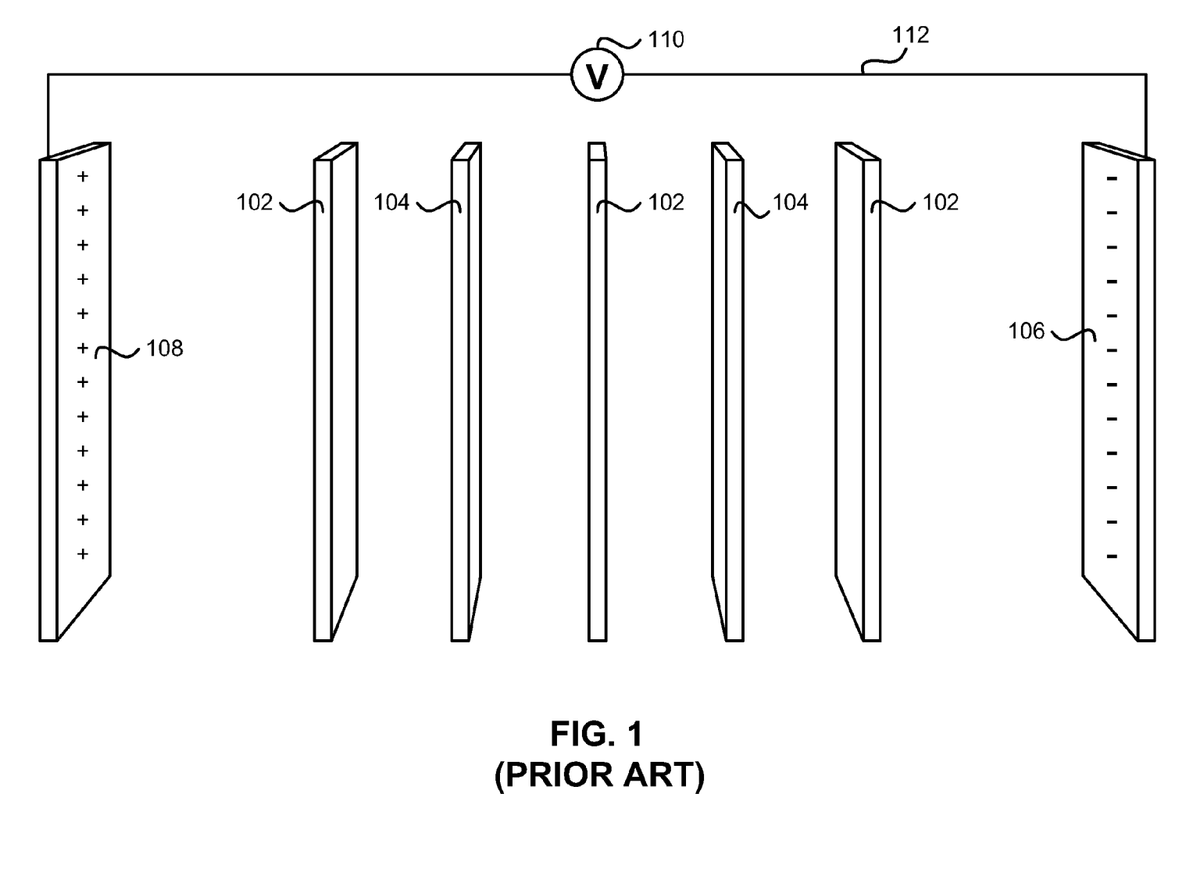
FIG. 1 shows a schematic of the standard electrodialysis (ED) process.

Reverse osmosis, nanofiltration, and ultrafiltration are processes that use an applied pressure to remove impurities from water. In comparison, electrodialysis and electrodeionization processes use an electric field to remove impurities from water. A schematic of one type of standard electrodialysis (ED) process in shown in FIG. 1. A potential or voltage 110 is applied to two metal electrodes denoted as anode (+) 108 and cathode (−) 106 in FIG. 1. Stacks of alternating cation permeable membranes 104 and anion permeable membranes 102 are in between the electrodes. These membranes are typically made of ion exchange resins that only permit the passage of canons (cation permeable) or anions (anion permeable). An example of how the process works is shown in FIG. 2.

Figure 2:
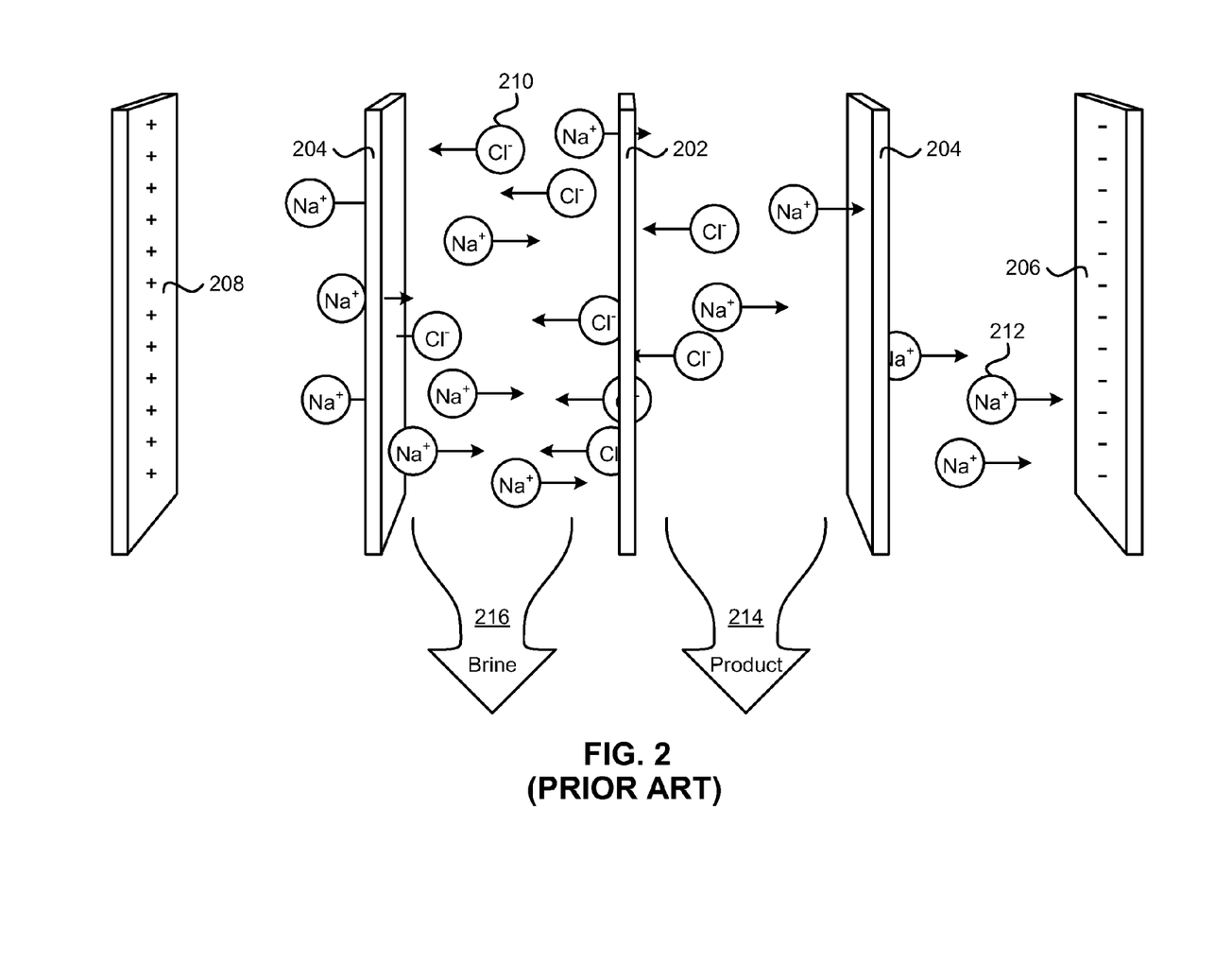
FIG. 2 is a schematic of a working ED process.

Referring to FIG. 2, in this example, water with a high salt content (e.g., NaCl) flows into the top of the assembly. As the water flows to the bottom, Na+ ions 212 and Cl− ions 210 are removed from the water. The purified water 214 flows out the bottom. Cations (Na+) 212 and anions (Cl−) 210 are concentrated in one compartment (brine) 216, while product water is produced in the other compartment. A cathode 206 and an anode 208 are positioned on either side of an alternating series of cation selective permeable membranes 202 and anion selective permeable membranes 204. Cations and anions must diffuse from the input stream, through the membranes, and into the brine or product streams. This diffusion process is driven by the applied potential or voltage (V). The amount of cations or anions removed in a given amount of time relates to the current (I). The electrical resistance of the membrane can be defined as R. Using Ohm's Law, V/R−I. This implies that for a given applied voltage, the greater the electrical resistance of the membrane, the lower the current or amount of ions removed from the water per given time. These relationships imply that lowering the resistance of the membranes should increase the current or amount of ions removed per given time.

The electrodeionization (EDI) process very similar to the ED process. In this case, ion exchange resin beads are used to fill in the spaces between the membranes in FIGS. 1 and 2. The ion exchange resin beads assist in removing small traces of cations and anions that are present in the feed water. Cations and anions are still transported through the membranes and the Ohm's Law discussion described above is still valid.

In order for membranes to function properly in ED and EDI applications, they must be selective for either cations or anions. In other words, anion permeable membranes should enable only the transport of anions, while cation membranes should enable only the transport of cations. As a result, traditional ED and EDI membranes are nonporous meaning that there are no pores large enough to allow bulk flow of water and ions. Ion transport through these nonporous membranes tends to be slow. This is one of the reasons for the high electrical resistivity of traditional ED and EDI membranes.

ED and EDI membranes are commonly made from polymers that have poor mechanical properties. The types of polymers that transport ions also tend to have poor mechanical properties. The thickness of the membranes must be great enough to withstand factors such as packing stacks of the membranes and withstanding pressure differentials across the membranes.

Commercial ED and EDI membranes not only suffer from high electrical resistances, but also must be stored in special solutions (i.e., stored wet). The performance of these membranes decreases when they dry out. These membranes are continuous, i.e., they do not have pores and are relatively thick. These features slow transport of ions across the membrane.

Prior art sources have focused on using advances in the chemistry of ion exchange resins to enhance the transport properties of membranes used in ED and EDI processes. Various functional groups have been added to the polymer chains of the ion exchange resins used to fabricate the membranes. These functional groups are reported to enhance the ability of the membrane to transport only cations, only anions, and/or only certain rations or anions. These types of improvements either alter the chemistry of the polymer backbone or alter side chains on the polymer. Also, asymmetric or composite membranes can he prepared. This approach, which has traditionally been used for gas separation membranes, was applied to ED and EDI membranes. It results in a thin dense layer (nonporous layer) on the top of a microporous hacking. The procedure to form these asymmetric structures is complicated and requires casting from solvents and working with emulsions. It has been shown previously that residual solvent in asymmetric films influences the transport properties of the films. Transport of ions still relies on the same mechanisms described previously.

Charge-mosaic membranes and bipolar membranes attempt to increase the efficiency of separation processes by combining cation and anion selective membranes into a layered structure. These membranes are still based on traditional on exchange resins and the transport of ions is very similar to previously described art. They are nonporous as are the layers containing functional groups on the polymers that drive the separation process.

Nanoporous structures have been discussed in the prior art for separation of charged macromolecules, e.g., DNA. These systems employ the use of ion-track etched polymers that have been coated with metals. A separate charge must be applied to the metalized polymer in order to create a surface charge. This system requires special asymmetric pores. In addition, a voltage is not only applied to the metalized polymer, it is also applied across the metalized membrane. This creates a very energy intensive and costly system due to the need to apply multiple voltages and the need to design specific asymmetric pores.

In order to reduce the energy required to purify water it would he desirable to decrease the thickness of the membrane. In addition, it would be desirable to transport the ions through the film using a mechanism different than the mechanism used in traditional nonporous films. It would also be beneficial to enhance the mechanical properties of the membrane. This would enable thinner membranes to be utilized. In addition, the operational and maintenance costs of separation systems could he decreased if membranes were not required to be stored in special solutions.

SUMMARY

A device according to one embodiment includes a porous membrane having a surface charge and pore configuration characterized by a double liner overlap effect being present in pores of the membrane.

A device according to another embodiment includes a porous membrane having a surface charge in pores thereof sufficient to impart anion or cation selectivity in the pores.

A deionization system according to one embodiment includes a barrier; an anode; a cathode; and at least one of a cation selective porous membrane and an anion selective porous membrane positioned between the anode and the cathode. The cation selective porous membrane, if present, has a negative surface charge and pore configuration characterized by a double layer overlap effect being present in pores of the membrane. The anion selective porous membrane, if present, has a positive surface charge and pore configuration characterized by a double layer overlap effect being present in pores of the membrane.

A method for separating ions from a fluid according to one embodiment includes setting a potential of an anode and a cathode; and contacting as fluid with at least one of a cation selective porous membrane and an anion selective porous membrane positioned between the anode and the cathode. The cation selective porous membrane, if present, has a negative surface charge and pore configuration characterized by permitting cations to pass through the pores thereof. The anion selective porous membrane, if present, has a positive surface charge and pore configuration characterized by permitting anions to pass through the pores thereof.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also he noted that, as used in the specification and the appended claims, the singular forms "a," "an" and "the" include plural referents unless otherwise specified.

In one general embodiment, a device comprises a porous membrane having a surface charge and pore configuration characterized by a double layer overlap effect being present in pores of the membrane.

In another general embodiment, a device comprises a porous membrane having a surface charge in pores thereof sufficient to impart anion or cation selectivity in the pores.

In another general embodiment, a deionization system comprises to barrier; an anode coupled to the barrier; a cathode coupled to the barrier; and at least one of a cation selective porous membrane and an anion selective porous membrane positioned between the anode and the cathode, wherein the cation selective porous membrane, if present, has a negative surface charge and pore configuration characterized by a double layer overlap effect being present in pores of the membrane, wherein the anion selective porous membrane, if present, has a positive surface charge and pore configuration characterized by a double layer overlap effect being present in pores of the membrane.

In another general embodiment, a method for separating ions from a fluid, comprising: setting a potential of an anode and a cathode; Contacting a fluid with at least one of a cation selective porous membrane and an anion selective porous membrane positioned between the anode and the cathode, wherein the cation selective porous membrane, if present, has a negative surface charge and pore configuration characterized by permitting cations to pass through the pores thereof, wherein the anion selective porous membrane, if present, has a positive surface charge and pore configuration characterized by permitting anions to pass through the pores thereof.

In any of the approaches described herein, many membranes may be present, including hundreds or thousands of them. Moreover, in approaches having pairs of cation and anion selective membranes, multiple pairs may he present, including hundreds or thousands of pairs.

In some embodiments, Field Induced Charge Separation Membranes (FIC Membranes) offer the following advantages over traditional ED and EDI membranes:
1. Nanoporous membranes that transport ions due to a double layer overlap effect.
2. Built with materials known as have excellent mechanical properties, therefore are significantly thinner than conventional ED and EDI membranes.
3. Do not require storage in special solutions.
4. Surfaces can be nanoengineered to enable them to be selective for either anions or cations.
5. Require less energy per unit weight to purify water than conventional ED and EDI membranes.

The transport process for FIC membranes differs significantly from the transport of ions through conventional ED and EDI membranes. Conventional ED and EDI membranes rely on transport of ions through the continuous membrane, i.e., there are no pores present. Changes in the functional groups on the polymer used to fabricate the membrane enables the membrane to be either selective for anions or cations. In comparison, FIC membranes are selective for either cations or anions based on one or more of the following factors:
1. Surface Charge: The surface charge creates either a positively charged surface (attracts anions, therefore anion selective) or a negatively charged surface (attracts cations therefore cation selective).
2. Pore Size: In conjunction with the surface charge, the pore size may he small enough to enable the double layer overlap effects in the pores.
3. Pore density: If the pore size is the proper diameter, increasing the pore density will increase the amount of ions being transported through the membrane.
4. Functional Groups: The surface is functionalized with groups that preferentially interact with certain cations or anions. For example, placing quaternary amines on the surface creates a surface that preferentially attracts anions, especially nitrate ions.

The surface charge on the surface membrane is one of the factors that determines whether the membrane is selective for cations or anions. An inherently negatively charged surface results in a membrane that is more selective for cations, whereas a positively charged surface results in a membrane that is more selective for anions. In addition, other methods may be used, such as excimer laser ablation, to impart positive charges to polymeric films. Furthermore, functional groups, such as quaternary amines, can he added to the surface to further enhance the ability to remove either cations or anions from the solution.

The pores are preferably small, i.e., nanometer sized (e.g., between about 1 and about 500 nm, more preferably between about 1 and about 30 nm for ion separation; liner or smaller for other types of separations as will be understood by those skilled in the art apprised with the teachings herein), and are preferably as regular and uniform in size as possible. In some approaches, an average or mean diameter of the pores in the membrane(s) may be less than about 30 nm, alternatively between about 6 nm and about 16 nm, but could be higher or lower, such as 3 nm or 18 nm.

In some additional embodiments, a pore density of the membrane(s) may be about $1 \times 10^9$ pores/cm$^2$ or greater. However, the pore density of the membrane(s) may be lower in some embodiments, e.g., $1 \times 10^8$ pores/cm$^2$ or less.

One approach for forming a porous membrane includes ion tracking and subsequent etching of polymers. This method has been shown to produce relatively uniform pore diameters ranging from approximately 100 nm to less than about 10 nm and. Of course, any method for forming the various components of the inventive systems may be used. In one example, one embodiment may include a polymer membrane that has and retains the desired functional group after the pores are formed (in one example, etched into) the polymer membrane.

In some preferred embodiments, a device comprises a porous membrane having a surface charge and pore configuration characterized by a double layer overlap effect being present in pores of the membrane. Another device may comprise a porous membrane having a surface charge (e.g. in one nonlimiting example, functional groups within a polymer structure) in pores thereof sufficient to impart anion or cation selectivity in the pores.

In some embodiments, the device may be included in a deionization system, which may further comprise a barrier, an anode coupled to the barrier, and a cathode coupled to the barrier. The device included in the deionization system may comprise a cation selective porous membrane and/or an anion selective porous membrane, positioned between the anode and the cathode. The cation selective porous membrane, if present, may have a negative surface charge and pore configuration characterized by a double layer overlap effect being present in pores of the membrane. The anion selective porous membrane, if present, may have a positive surface charge and pore configuration characterized by a double layer overlap elect being present in pores of the membrane.

In some embodiments of the deionization system, both the cation selective porous membrane and the anion selective porous membrane may be present.

In one approach, an array of cation selective porous membranes may be present. In an alternative approach, or in combination with the foregoing, an array of anion selective porous membranes may be present.

In a further approach, the cation and/or anion selective porous membrane(s) may be ion specific, e.g., may he selective to specific cations or anions, such as calcium vs. sodium, nitrate vs. chloride, divalent vs. monovalent, etc.

In some embodiments of the deionization system, the cation selective porous membrane may include a polyimide layer. In other embodiments, the anion selective porous membrane may have quaternary amines coupled thereto. The quaternary amines may be in titanate compounds, and may also be polymerized.

In some preferred embodiments, the membrane(s) in the device may he characterized as not requiring storage in a solution for maintaining an effectiveness thereof. For example, the membrane(s) may be stored in the air or in a package sealed against the air, and the effectiveness of the membrane(s) will not be affected by prolonged exposure to environments outside of any solution. This in particular would avoid requirements for storage in liquid solutions as is required in the case of many conventional membranes.

In some embodiments, a surface of the membrane(s) may include functional groups that preferentially interact with either cations or anions.

In some approaches, the device may further comprise a polymer on a surface of the membrane for imparting the surface charge. In further approaches, the polymer includes functional groups.

In some embodiments, a method for separating ions from a fluid may comprise setting it potential of an anode and a cathode and contacting a fluid with at least one of as cation selective porous membrane and an anion selective porous membrane positioned between the anode and the cathode. In some embodiments, the cation selective porous membrane, if present, may have a negative surface charge and pore configuration characterized by permitting cations to pass through the pores thereof. In addition, in some embodiments, the anion selective porous membrane, if present, may have as positive surface charge and pore configuration characterized by permitting anions to pass through the pores thereof.

In some preferred embodiments of the method, both the cation selective porous membrane and the anion selective porous membrane may be present.

Experiments

Figure 3:
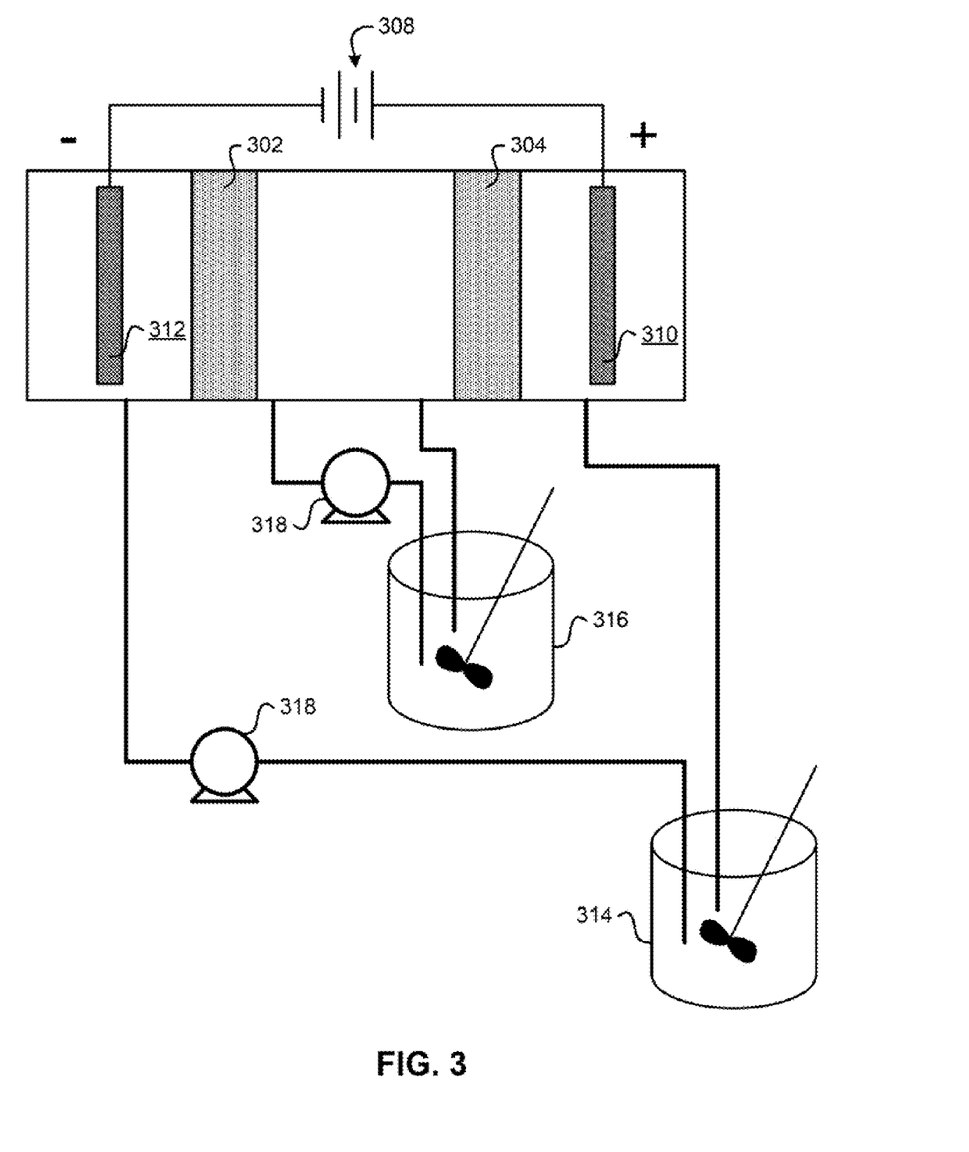
FIG. 3 is a schematic of a system for testing methods of deionizing water according to one embodiment.

The system shown in FIG. 3 was used to evaluate the performance of different membranes. The applied voltage, from voltage source 308, remained constant, while the resulting current was measured as a function of time. A cathode 312 and an anode 310 were placed on either side of membranes 302 and 304, which may be the same or different types of membranes. In the typical electrodialysis operation membrane 302 would be the cation membrane and membrane 304 would be the anion membrane. A microprocessor was used to measure the pH, conductivity, and temperature for both the MID chamber 316 and the CATION/ANION chamber 314 as a function of time. Pumps 318 were used to transport the solution into the MID chamber 316 and the CATION/ANION chamber 314. Ion selective electrodes (ISEs) were used to monitor the transport of specific ions. One of the major ions of interest was the nitrate ion, therefore nitrate ISEs were placed in both the MID and CATION/ANION chambers. The plethora of possible embodiments of this invention are not to he limited to the specific examples given below but rather these experiments illustrate exemplary elements of the invention.

Initial conductivities and nitrate levels for both the MID and CATION/ANION chambers were measured. The voltage was applied in a fashion in order to move nitrate ions from the MID Chamber to the CATION/ANION chamber. Conductivity and nitrate ion levels were then monitored as a function of time. Evidence of the performance of the membranes was an increase in conductivity and nitrate levels in the CATION/ANION chamber and a decrease in conductivity and nitrate levels in the MID chamber. The rate of change of conductivity (slope of the conductivity as a function of time) or the rate of change of the nitrate level (slope of nitrate level as a function of time) for a given applied voltage provides a measure of the relative performance of different membranes. The larger the reduction in the rate of Change of the conductivity or the rate of change of the nitrate level as a function of time for a given voltage, the less energy is used to remove the specific contaminant.

Experiment I

Standard commercial cation and anion membranes manufactured by Ionics Corporation were placed into the apparatus shown in FIG. 3. In this experiment membrane 302 was the cation membrane and membrane 304 was the anion membrane. Both the MID and CATION/ANION chambers were filled with a solution of approximately 1000 ppm of $NaNO_3$ in deionized water. A constant voltage of 8 volts was applied. The rate of change of the conductivity of the MID chamber was −143 μSiemens/cm-hr. The rate of change of the nitrate level of the MID chamber was −92 ppm/hr.

Experiment II

The Standard commercial cation and anion membranes from Experiment I were reversed from the configuration shown in FIG. 3, i.e., the cation membrane was placed in the location where the anion membrane is shown in FIG. 3. This resulted in the anion membrane being in front of the negative platinum electrode and the cation membrane in front of the positive platinum electrode. This configuration should not Facilitate the transport of ions. It measures the selectivity of the membranes or their ability to act as a "diode." Both the MID and CATION/ANION chambers were filled with a solution of approximately 1000 ppm of $NaNO_3$ in deionized water. A constant voltage of 8 volts was applied. The rate of change of the conductivity of the MID chamber was −5 μSiemens/cm-hr (within the drift of the instrument). There was no detectable change of the nitrate level of the MID chamber. This demonstrated that the commercial membranes are highly selective and exhibit a strong "diode effect."

Experiment III

The commercial membranes from Experiments I and II were placed into the apparatus shown in FIG. 3, using the same arrangement of anion and cation membranes as in Experiment I. Both the MID and CATION/ANION chambers were filled with a solution of approximately 1000 ppm of $NaNO_3$ in deionized water. A constant voltage of 4 volts was applied. The rate of change of the conductivity of the MID chamber was −34 μSiemens/cm-hr. The rate of change of the nitrate level of the MID chamber was −12 ppm/hr.

Experiment IV

To test cation selective FIC membranes, the commercial Anion membrane from Experiments I and II was placed into the apparatus shown in FIG. 3. The cation membrane used for this test was an FIC membrane. The FIC membrane was produced using a Solventless Vapor Deposition method followed by an In Situ Polymerization (SLIP) process, as would be known by one of skill in the relevant art. The polymer coating was formed by depositing and reacting pyromellitic dianhydride (PMDA) and diamine oxydianiline (ODA). The final polyimide produced from, the reaction of this dianhydride and diamine is poly [N,N'-(phenoxyphenyl)-pyromellitimide] (i.e., PMDA-ODA). The result was a 100 nm thick polyimide film onto a PORETICS® 10 nm (10 nm pore diameter) polycarbonate membrane. Both the MID and CATION/ANION chambers were filled with a solution of approximately 1000 ppm of $NaNO_3$ in deionized water. A constant voltage of 8 volts was applied. The rate of change of the conductivity of the MID chamber was −170 μSiemens/cm-hr. The rate of change of the nitrate level of the MID chamber was −168 ppm/hr.

Experiment V

Figure 4:
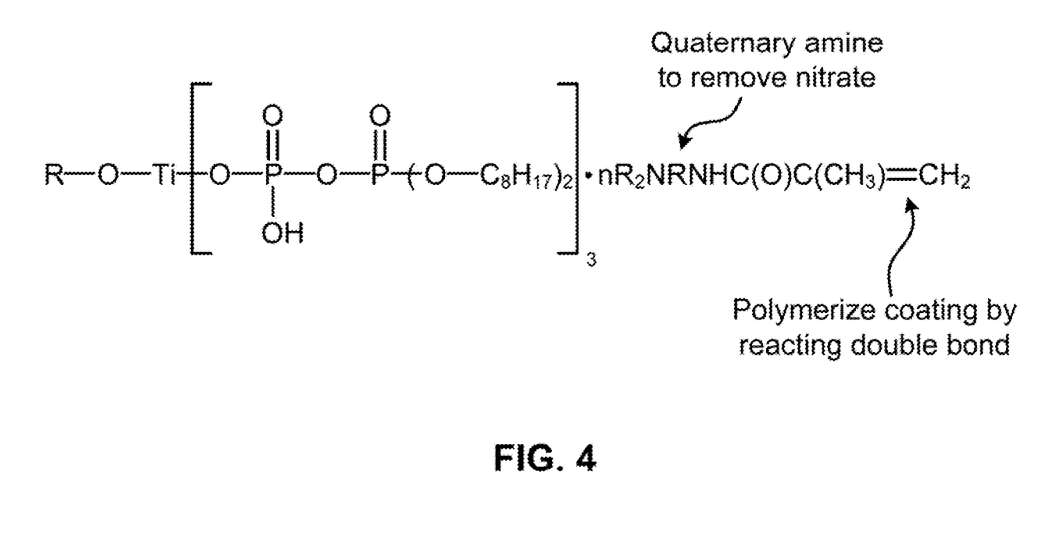
FIG. 4 is the chemical structure of LICA 38J.

To test anion selective FIC membranes, the commercial cation membrane from Experiments I and II was placed into the apparatus shown in FIG. 3. The anion membrane used for this test was an FIC membrane. The FIC membrane was produced by casting a 0.1% aqueous solution of LICA 38J (supplied by KENRICH PETROCHEMICAL, INC.) onto a PORETICS® 10 nm (10 nm pore diameter) polycarbonate membrane. The chemical structure of LICA 38J is shown in FIG. 4. The sample was air dried over night, then placed under an Ultraviolet (UV) lamp in the presence of a nitrogen atmosphere for about 10 minutes. Both the MID and CATION/ANION chambers were filled with a solution of approximately 1000 ppm of $NaNO_3$ deionized water. A constant voltage of 8 volts was applied. The rate of change of the conductivity of the MID chamber was −186 μSiemens/cm-hr. The rate of change of the nitrate level of the MID chamber was −129 ppm/hr.

The quaternary amine structure of the LICA 38J enables the material to perform well as an anion selective membrane. The LICA 38J is polymerized through the double bond on exposure to UV radiation under a nitrogen atmosphere. Polymerization of the film imparts additional stability to the film.

Experiment VI

To test anion selective FIC membranes, the commercial cation membrane from Experiments I and II was placed into the apparatus shown in FIG. 3. The anion membrane used for this test was the FIC membrane from Experiment V. Both the MID and CATION/ANION chambers were filled with a solution of approximately 1000 ppm of $NaNO_3$ in deionized water. A constant voltage of 4 volts was applied. The rate of change of the conductivity of the MID chamber was −69 μSiemens/cm-hr. The rate of change of the nitrate level of the MID chamber was −62 ppm/hr.

Experiment VII

To test cation and anion FIC membranes, the FIC cation membrane from Experiment IV and the FIC anion membrane from Experiment V were placed into the apparatus shown in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −133 μSiemens/cm-hr. The rate of change of the nitrate level of the MID chamber was −94 ppm/hr.

Experiment VIII

To test canon and anion FIC membranes, the FIC membranes from Experiment VII were placed into the apparatus shown in FIG. 3. Both the MID and CATION/ANION chambers were filled with a solution of approximately 1000 ppm of NaNO$_3$ in deionized water. A constant voltage of 4 volts was applied. The rate of change of the conductivity of the MID chamber was −56 μSiemens/cm-hr. The rate of change of the nitrate level of the MID chamber was −37 ppm/hr.

Experiment IX

To calculate the energy requirements of the FIC membranes versus the energy requirements of commercial membranes, the FIC membrane and commercial anion membrane from Experiment IV were reversed in their configurations as described in Experiment II. This tests the selectivity of the membrane pair or the "diode effect," as previously mentioned. Both the MID and CATION/ANION chambers were filled with a solution of approximately 1000 ppm of NaNO$_3$ in deionized water. A constant voltage of 8 volts was applied. There was no detectable rate of change of the conductivity of the MID chamber and no detectable change of the nitrate level of the MID chamber. This demonstrated that FTC membranes are highly selective and exhibit a strong "diode effect."

Figure 5:
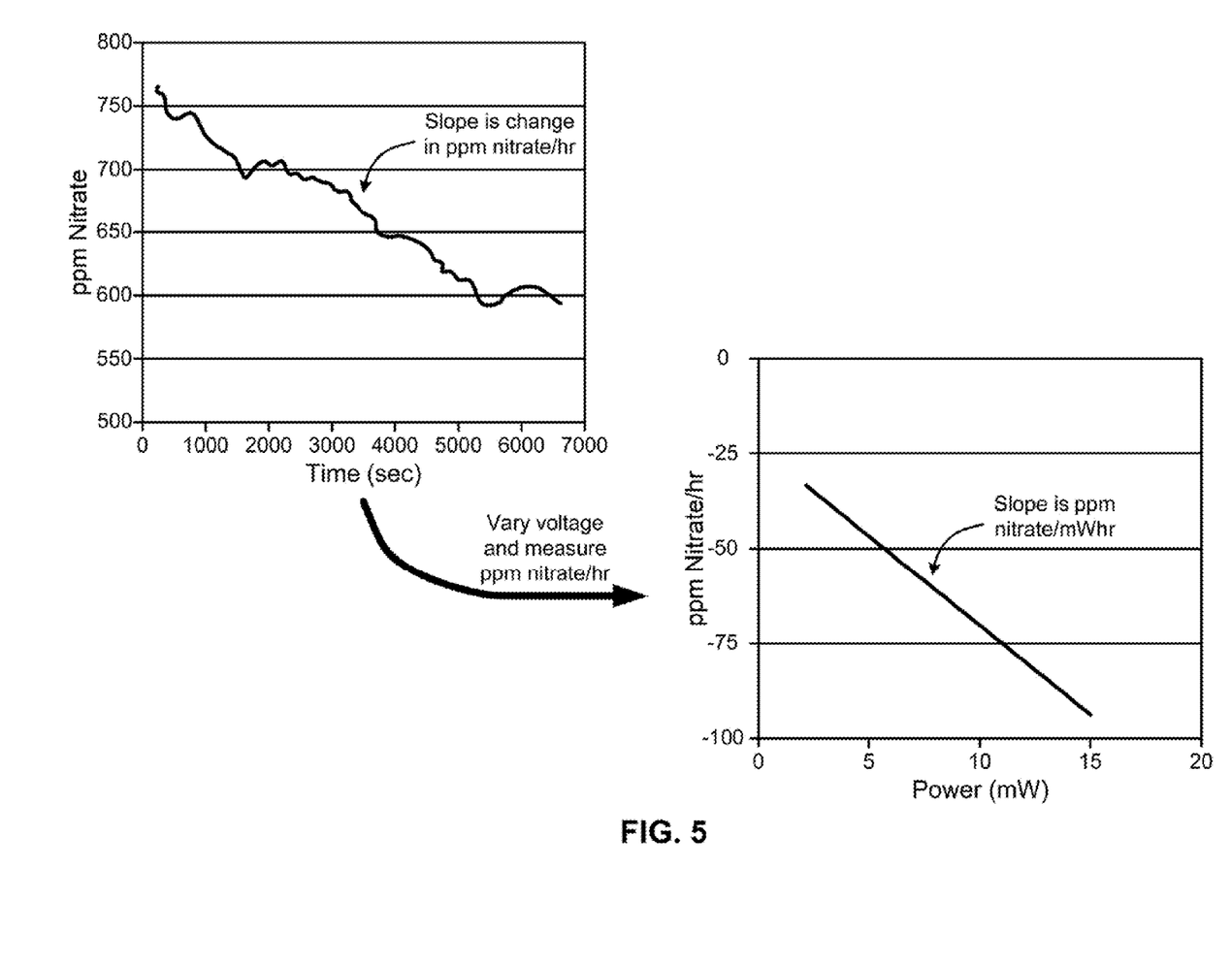
FIG. 5 shows a series of graphs which show how to make a nitrate/mWhr calculation.

The power, in mW, needed to remove the nitrate ions from the MID chamber can be calculated by multiplying the voltage (V) applied by the measured current (mA). The rate of change of the nitrate levels in the MID chamber (ppm Nitrate/hr) can then be plotted against the power required to perform the separation. The slope of the plot of ppm Nitrate/hr. vs. mW curve is a measure of the ppm Nitrate/mWhr. The procedure to perform this calculation is outlined in FIG. 5. This is a measure of the amount of change of ppm Nitrate per mWhr or the amount of nitrate removed per unit of energy. The larger this value, the less energy is needed to remove nitrate, i.e., the membrane is more energy efficient.

Table 1 shows a comparison of energy requirements per weight for FIC membranes as compared to commercial counterparts by comparing the results from Experiments I and III for the two commercial membranes and Experiments VII and VIII for the FIC membranes. The FIC membrane pair exhibits a greater ppm Nitrate per mWhr (22% greater), and therefore removes more nitrate ions from the MID chamber per unit of energy than the commercial membranes. In addition, the FIC membranes weigh less than their commercial counterparts. As a result, the FIC membranes remove more nitrate ions from the MID chamber per unit of energy per weight of material (nearly 100 times greater) than their commercial counterparts, resulting in vastly greater performance and efficiency.

TABLE 1

| Experiment | Cation Membrane | Anion Membrane | ppm Nitrate/ mWhr | Total Weight (gm) | ppm Nitrate/ mWhr-gm |
|---|---|---|---|---|---|
| I & III | Commercial | Commercial | 4.6 | 0.68 | 6.8 |
| VII & VIII | FIC | FIC | 5.6 | 0.0084 | 666 |

Table 2, a comparison of energy requirements per volume for membranes as compared to their commercial counterparts compares the same results from Experiments I, III, VII, and VIII, but compares them on a volume basis. The FIC membranes remove more nitrate ions from the MID chamber per unit of energy per volume of material (over 200 times greater) than their commercial counterparts.

TABLE 2

| Experiment | Cation Membrane | Anion Membrane | ppm Nitrate/ mWhr | Total Volume (cc) | ppm Nitrate/ mWhr-cc |
|---|---|---|---|---|---|
| I & III | Commercial | Commercial | 4.6 | 0.16 | 29 |
| VII & VIII | FIC | FIC | 5.6 | 0.00094 | 5942 |

Figure 6:
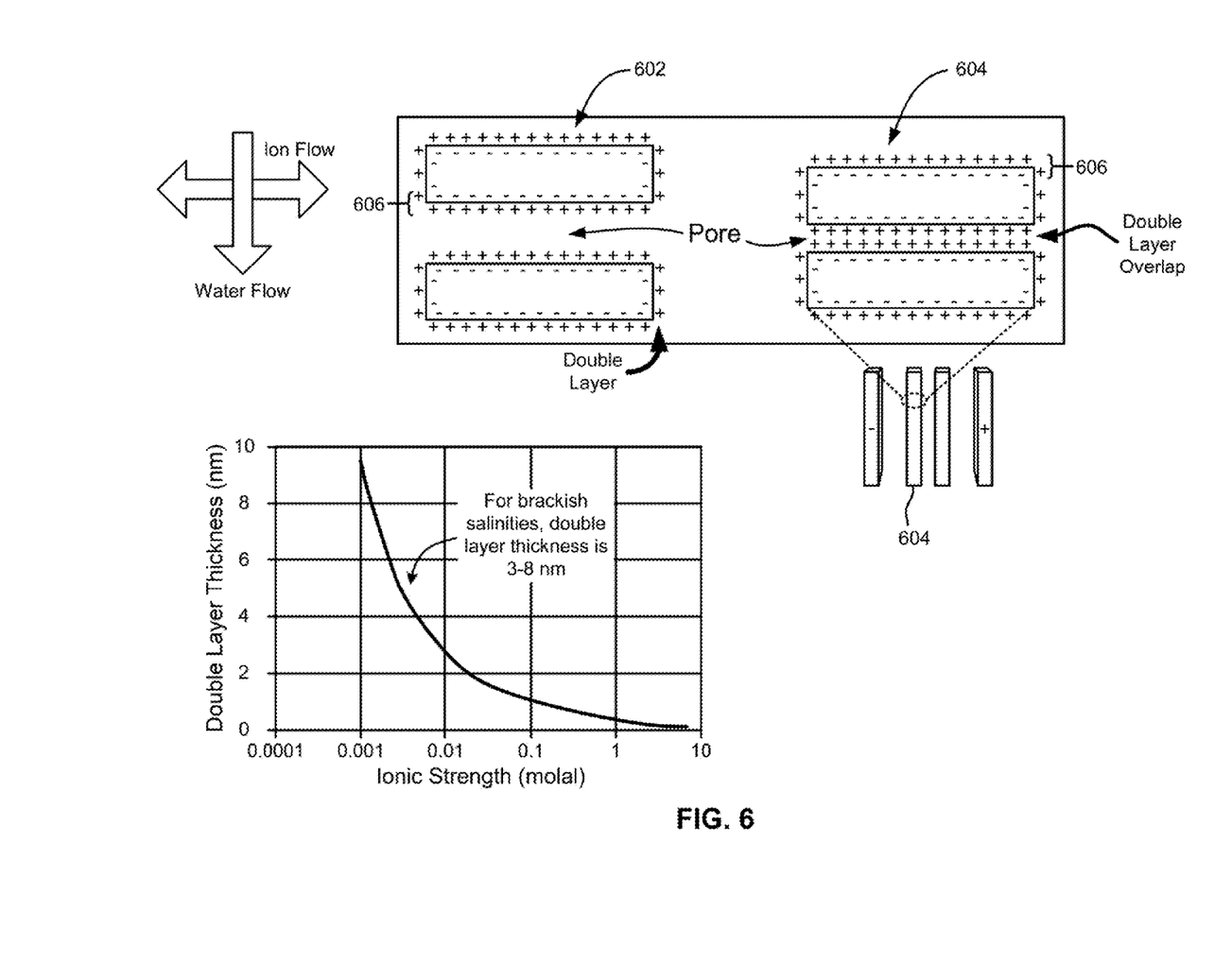
FIG. 6 shows that double layer effect according to one embodiment.

The charge on the surface of the membrane is also important for FIC membranes. The double layer effect is demonstrated in FIG. 6. As shown in the membranes 602, 604 of FIG. 6, the negatively charged pore surface in each membrane 602, 604 attracts a layer of positive ions from the solution, thus forming a double layer 606 of charges, e.g., a negative charge in the pore wall and a positive charge in particles attracted thereto. Double layer overlap occurs when the pore size is decreased enough that the double layer from the top side of the pore overlaps the double layer from the bottom side of the pore. This can be seen by comparing the partial view of membrane 602, which does not exhibit double layer overlap, with the partial view of membrane 604, which does exhibit double layer overlap. This double layer overlap imparts selectivity to the membrane. For example in this case only cations will be transported through the pore. If double layer overlap does not occur, the membrane may lose its selectivity. As shown in FIG. 6, this could mean that it would pass ions as well as cations. It is predicted that membranes need to have pore diameters less than approximately 16 nm in order for double layer overlap to occur when the feed water is brackish water (total dissolved solids of approximately 1,000 or less). Double layer overlap may not occur for pores greater than 16 nm for the nominal range of brackish water (larger pores might work very dilute water solutions).

Experiment X

To demonstrate the effect of pore size nanoporous membranes, the commercial anion membrane described in Experiment I was placed into the apparatus shown in FIG. 3. A PORETICS® 10 nm (10 nm pore diameter) membrane was used as the cation membrane and placed in the apparatus FIG. 3. Both the MID and CATION/ANION chambers were filled with a solution of approximately 1000 ppm of NaNO$_3$ in deionized water. A constant voltage of 8 volts was applied. The rate of change of the conductivity of the MID chamber was −60 μSiemens/cm-hr.

Experiment XI

To demonstrate the effect of pore size in nanoporous membranes, the commercial cation membrane from Experiment I was placed in the apparatus in FIG. 3. The PORETICS® 10 nm membrane from Experiment X was used as the anion membrane for this experiment. Both the MID and CATION/ANION chambers were filled with a solution of approximately 1000 ppm of NaNO$_3$ in deionized water. A constant voltage of 8 volts was applied. The rate of change of the conductivity of the MID chamber was −17 μSiemens/cm-hr. This change in conductivity was within the drift of the conductivity meter. This demonstrated that the sample with 10 nm pores preferentially enabled the transport of cations over anions.

Experiment XI

To demonstrate the effect of pore size in nanoporous membranes, the commercial anion membrane described in Experiment I was placed into the apparatus shown in FIG. 3. A PORETICS® 30 nm membrane was used as the cation membrane and placed in the apparatus in FIG. 3. Both the MID and CATION/ANION chambers were filled with a solution of approximately 1000 ppm of NaNO$_3$ in deionized water. A constant voltage of 8 volts was applied. The rate of change of the conductivity of the MID chamber was −84 μSiemens/cm-hr.

Experiment XIII

To demonstrate the effect of pore size in nanoporous membranes, the commercial cation membrane from Experiment I was placed in the apparatus in FIG. 3. The PORETICS® 30 nm membrane from Experiment XII was used as the anion membrane for this experiment. Both the MID and CATION/ANION chambers were filled with a solution of approximately 1000 ppm of $NaNO_3$ in deionized water. A constant voltage of 8 volts was applied. The rate of change of the conductivity of the MID chamber was −69 μSiemens/cm-hr. This demonstrated that the sample with 30 nm pores transported both cations and anions and had much poorer selectivity than the 10 nm sample. Table 3 summarizes the results from Experiments X through XIII.

TABLE 3

| Experiment | Cation Membrane | Anion Membrane | Change in Conductivity of MID Chamber (μSiemens/cm-hr) |
|---|---|---|---|
| X | PORETICS ® 10 nm | Commercial Anion | −60 |
| XI | Commercial Cation | PORETICS ® 10 nm | −17 |
| XII | PORETICS ® 30 nm | Commercial Anion | −84 |
| XIII | Commercial Cation | PORETICS ® 30 nm | −69 |

Experiment XIV

To demonstrate the effect of pore density on nanoporous membranes, the commercial anion membrane described in Experiment I was placed into the apparatus shown in FIG. 3. An ion track etched membrane supplied by IT4IP with 15 nm pores and a pore density of $1\times10^9$ pores/cm² was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −83 μSiemens/cm-hr.

Experiment XV

To demonstrate the effect of pore density on nanoporous membranes, the commercial anion membrane described in Experiment I was placed into the apparatus shown in FIG. 3. An ion track etched membrane supplied by IT4IP with 15 nm pores and a pore density of $4\times10^9$ pores/cm² was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −106 μSiemens/cm-hr. This is a 27% increase in the rate of change in conductivity over the sample tested in Experiment XIV.

Experiment XVI

To demonstrate the effect of pore density on nanoporous membranes, the commercial cation membrane described in Experiment I was placed into the apparatus shown in FIG. 3. The membrane with a pore density of $4\times10^9$ pores/cm² described in Experiment XV was used as the anion membrane and placed in the apparatus in FIG. 3. Both the MID and CATION/ANION chambers were filled with a solution of approximately 1000 ppm of $NaNO_3$ in deionized water. A constant voltage of 8 volts was applied. There was no detectable rate of change of the conductivity of the MID chamber. This demonstrated that if the pore size is in the proper range, increasing pore density can increase the transport of ions without a loss in selectivity (i.e., without a loss in "diode effect"). Table 4 summarizes the results from Experiments XIV through XVI.

TABLE 4

| Experiment | Cation Membrane | Anion Membrane | Pore Density (pores/cm²) | Change in Conductivity of MID Chamber (μSiemens/cm-hr) |
|---|---|---|---|---|
| XIV | It4ip 15 nm | Commercial Anion | $1\times10^9$ | −83 |
| XV | It4ip 15 nm | Commercial Anion | $4\times10^9$ | −106 |
| XVI | Commercial Cation | It4ip 15 nm | $4\times10^9$ | Non Detected |

The results in the preceding experiments demonstrate that when designing FIC membranes for deionizing water, the following considerations are preferred:

1. Surface Charge: The inherent surface charge of the cation selective membrane is negative, while the surface charge of the anion selective membrane is positive.
2. Pore Size: Less than about 30 nm, preferentially between about 6 nm and about 16 nm.
3. Pore Density: Based on pore size above, preferential pore density equal to or greater than about $1\times10^9$ pores/cm². Increasing pore density increases performance.
4. Functional Groups: Nanolayers of materials preferred on the surface to prevent clogging of pores. The deposition of polyimides using the SLIP process is promising since the polyimide imparts a negative charge to the surface and when deposited using SLIP does not clog the pores. Titanate compounds that combine quaternary amines hind to the surface of the ion track-etched polycarbonate and are anion selective. The presence of double bonds in the compound enables the film to be polymerized for added stability. Other materials can similarly be added to the surfaces (pores) of the membranes along with other approaches such as incorporation of functional groups to similarly improve the membrane performance.

In Use

Uses for the various embodiments of the present invention are numerous, and not limited by the teachings herein. Illustrative uses include water purification, materials separation in aqueous and nonaqueous streams, site remediation, biological and medical applications, etc. Illustrative water purification applications include purifying water for potable water, semiconductor processing, industrial water applications, (e.g., purifying water for industrial boilers), etc.

While various embodiments have been described above, it should be understood that they have been presented by way of example only, and not limitation. Thus, the breadth and scope of a preferred embodiment should not he limited by any of the above-described exemplary embodiments, but should be defined only in accordance with the following claims and their equivalents.

What is claimed is:

1. A device comprising:
   a porous membrane in a solution, the membrane having a surface charge and pore configuration characterized by a double layer overlap effect being present in pores of the membrane;
   a polymer on a surface of the membrane,
   wherein the polymer includes functional groups that preferentially interact with cations, wherein the polymer includes poly [N,N'-(phenoxyphenyl)-pyromellitimide].

2. The device of claim 1, wherein a diameter of the pores in the membrane is less than about 30 nm.

3. The device of claim 1, wherein a diameter of the pores in the membrane is between about 6 and about 16 nm.

4. The device of claim 1, wherein a pore density of the membrane is about $1\times10^9$ pores/cm$^2$ or greater.

5. The device of claim 1, wherein a thickness of the polymer on the surface of the membrane is about 100 nm.

6. The device of claim 1, wherein the porous membrane is ion specific.

7. The device of claim 6, wherein the porous membrane is specific to an ion selected from a group consisting of: sodium and calcium.

8. A device, comprising:
    a porous membrane having a surface charge in pores thereof sufficient to impart cation selectivity in the pores;
    a polymer in the pores of the membrane,
    wherein the polymer is poly [N,N'-(phenoxyphenyl)-pyromellitimide].

9. The device of claim 8, wherein a diameter of the pores in the membrane is less than about 30 nm.

10. The device of claim 8, wherein a diameter of the pores in the membrane is between about 6 and about 16 nm.

11. The device of claim 8, wherein a pore density of the membrane is about $1\times10^9$ pores/cm$^2$ or greater.

12. The device of claim 8, wherein a surface of the membrane includes functional groups that preferentially interact with cations.

13. The device of claim 8, wherein the porous membrane is ion specific.

14. A deionization system, comprising:
    an anode;
    a cathode;
    a cation selective porous membrane and an anion selective porous membrane in a solution, the membranes positioned between the anode and the cathode,
    wherein the cation selective porous membrane has a negative surface charge and pore configuration characterized by a double layer overlap effect being present in pores of the membrane,
    wherein the anion selective porous membrane has a positive surface charge and pore configuration characterized by a double layer overlap effect being present in pores of the membrane,
    wherein at least one of the cation selective and anion selective membranes is ion specific,
    wherein a diameter of the pores in the cation selective membrane and the anion selective membrane is less than about 30 nm,
    and wherein a surface and/or the pores of the cation selective membrane includes a polymer for imparting the surface charge, the polymer including poly [N,N'-(phenoxyphenyl)-pyromellitimide].

15. The system of claim 14, wherein an array of cation selective porous membranes are present.

16. The system of claim 14, wherein an array of anion selective porous membranes are present.

17. The system of claim 14, wherein the cation selective porous membrane is on specific.

18. The system of claim 17, wherein the cation selective porous membrane is specific to an ion selected from a group consisting of calcium and sodium.

19. The system of claim 17, wherein the cation selective porous membrane is specific to monovalent ions.

20. The system of claim 17, wherein the cation selective porous membrane is specific to divalent ions.

21. The system of claim 14, wherein the anion selective porous membrane is ion specific.

22. the system of claim 21, wherein the anion selective porous membrane is specific to an on selected from a group consisting of chloride and nitrate.

23. The system of claim 14, wherein a diameter of the pores in at least one of the cation selective membrane and the anion selective membrane is between about 6 and about 16 nm.

24. The system of claim 14, wherein a pore density of at least one of the cation selective membrane and the anion selective membrane is about $1\times10$ pores/cm$^2$ or greater.

25. The system of claim 14, wherein a surface of the cation selective membrane includes functional groups that preferentially interact with cations, wherein a surface of the anion selective membrane includes functional groups that preferentially interact with anions.

26. The system of claim 14, wherein the cation selective porous membrane includes a polyimide layer.

27. The system of claim 14, wherein the anion selective porous membrane has quaternary amines coupled thereto.

28. The system of claim 27, wherein the quaternary amities are in titanate compounds.

29. The system of claim 28, wherein the titanate compounds are polymerized.

30. A method for separating ions from a fluid, comprising:
    setting a potential of an anode and a cathode;
    contacting a fluid with a cation selective porous membrane and an anion selective porous membrane positioned between the anode and the cathode,
    wherein the cation selective porous membrane has a negative surface charge and pore configuration characterized by permitting cations to pass through the pores thereof,
    wherein the anion selective porous membrane has a positive surface charge and pore configuration characterized by permitting anions to pass through the pores thereof, and
    wherein the cation selective membrane has poly [N,N'-(phenoxyphenyl)-pyromellitimide] coupled thereto.

31. The method of claim 30, wherein the cation selective membrane and/or the anion selective membrane is ion specific.

* * * * *